(12) United States Patent
Inazawa et al.

(10) Patent No.: US 8,808,480 B2
(45) Date of Patent: Aug. 19, 2014

(54) FLANGED FIBER-REINFORCED RESIN HOLLOW PART AND METHOD OF MOLDING THE SAME

(75) Inventors: Koichi Inazawa, Aichi (JP); Natsuhiko Katahira, Toyota (JP); Fujio Hori, Kariya (JP)

(73) Assignees: Toyota Jidosha Kabushiki Kaisha, Aichi (JP); Kabushiki Kaisha Toyota Jidoshokki, Aichi (JP)

( * ) Notice: Subject to any disclaimer, the term of this patent is extended or adjusted under 35 U.S.C. 154(b) by 1240 days.

(21) Appl. No.: 12/671,178

(22) PCT Filed: Aug. 1, 2008

(86) PCT No.: PCT/JP2008/063837
§ 371 (c)(1),
(2), (4) Date: Jan. 28, 2010

(87) PCT Pub. No.: WO2009/017217
PCT Pub. Date: Feb. 5, 2009

(65) Prior Publication Data
US 2010/0196639 A1 Aug. 5, 2010

(30) Foreign Application Priority Data
Aug. 1, 2007 (JP) ................................ 2007-200659

(51) Int. Cl.
*B29C 65/70* (2006.01)
*B29C 53/56* (2006.01)

(52) U.S. Cl.
USPC ........... 156/156; 156/149; 156/172; 156/173; 156/198; 156/287

(58) Field of Classification Search
USPC .......... 156/149, 156, 172, 287, 173, 198, 220
See application file for complete search history.

(56) References Cited

U.S. PATENT DOCUMENTS

| 4,624,460 A | 11/1986 | Murase et al. |
| 5,685,933 A * | 11/1997 | Ohta et al. ................... 156/175 |

(Continued)

FOREIGN PATENT DOCUMENTS

| JP | 58-056823 A | 4/1983 |
| JP | 59-174169 A | 10/1984 |

(Continued)

OTHER PUBLICATIONS

U.S. non-final Office Action for corresponding U.S. Appl. No. 12/808,611 issued on Aug. 29, 2012.

(Continued)

*Primary Examiner* — John Goff
*Assistant Examiner* — Scott W Dodds
(74) *Attorney, Agent, or Firm* — Sughrue Mion, PLLC (57) ABSTRACT

Provided is a method capable of easily and inexpensively molding a flanged fiber-reinforced resin hollow part with a non-uniform cross-section and a bent portion with a sufficiently reduced weight and substantially uniform thickness. To this end, a hollow laminate (20) is formed by laminating reinforced fibers (21) and matrix resin (24) on the circumference of a coupled body of a preformed hollow resin core (10) and a second core (15). The second core (15) is pulled out from the hollow laminate (20) and a region of the hollow laminate (20), from the second core (15) was pulled out, is pressed into a flange-shaped portion (26). A pressurization bag (30) is inserted into the hollow resin core (10) and it is then disposed within a shaping mold (40). Heat is applied while at the same time applying pressure to the inside of the pressurization bag (30) in the hollow laminate (20) disposed within the shaping mold, whereby the resin and the reinforced fibers are combined, inclusive of the flange-shaped portion (26).

5 Claims, 4 Drawing Sheets

(56) References Cited

U.S. PATENT DOCUMENTS

| | | | |
|---|---|---|---|
| 6,171,423 B1 * | 1/2001 | Murphy et al. | 156/172 |
| 2002/0081415 A1 | 6/2002 | Toi et al. | |
| 2004/0237760 A1 * | 12/2004 | Shimizu | 87/34 |
| 2005/0077643 A1 * | 4/2005 | Matsuoka | 264/103 |
| 2005/0121108 A1 | 6/2005 | Hyysti | |
| 2005/0258575 A1 | 11/2005 | Kruse et al. | |
| 2010/0288425 A1 | 11/2010 | Inazawa et al. | |

FOREIGN PATENT DOCUMENTS

| | | |
|---|---|---|
| JP | 62-244620 A | 10/1987 |
| JP | 02-072935 A | 3/1990 |
| JP | 04-179515 A | 6/1992 |
| JP | 04-286612 A | 10/1992 |
| JP | 07-174131 A | 7/1995 |
| JP | 10-168699 A | 6/1998 |
| JP | 2002-187204 A | 7/2002 |
| JP | 2002-187599 A | 7/2002 |
| JP | 2003-094448 A | 4/2003 |
| JP | 2003-328498 A | 11/2003 |
| JP | 2004-017412 A | 1/2004 |
| JP | 2005-153528 A | 6/2005 |
| JP | 2006-123475 A | 5/2006 |
| JP | 2006-130875 A | 5/2006 |
| JP | 2006-159457 A | 6/2006 |
| JP | 2006-305867 A | 11/2006 |
| JP | 2007-152718 A | 6/2007 |
| JP | 2007-260930 A | 10/2007 |

OTHER PUBLICATIONS

U.S. final Office Action for corresponding U.S. Appl. No. 12/808,611 issued on Jan. 9, 2013.

U.S. Notice of Allowance dated Jan. 29, 2014 issued in corresponding U.S. Appl. No. 12/808,611.

* cited by examiner

FLANGED FIBER-REINFORCED RESIN HOLLOW PART AND METHOD OF MOLDING THE SAME

TECHNICAL FIELD

The present invention relates to a fiber-reinforced resin hollow part with a flange portion integrally formed at one end thereof, and a method of molding such a hollow part.

BACKGROUND ART

A hollow part with a flange formed at one end thereof is often used as an automobile part. A flange portion is used as a connecting substrate for connection to another member. With the main body formed to be hollow, the weight of the part as a whole is reduced. Conventionally, the hollow part of such a kind has been formed mainly of metal materials. However, attempts are now made to form lighter-weight hollow parts using fiber-reinforced resin.

Fiber-reinforced plastic (FRP) is a resin obtained by combining matrix resin such as thermosetting resin or thermoplastic resin with reinforced fibers. FRP has a light weight and excellent strength properties. Examples of thermosetting resin used include unsaturated polyester resin, epoxy resin, and polyimide resin. Examples of thermoplastic resin include polyethylene, polypropylene, and polyamide. Examples of reinforced fibers include carbon fibers, glass fibers, and aramid fibers.

There have been proposed several methods of forming hollow parts using fiber-reinforced resin. Among them is an internal-pressure molding method. The internal-pressure molding method includes the following steps: disposing a hollow molding material within a cavity of a shaping mold, applying internal pressure from within the hollow material to thereby make the hollow material closely attached to the shaping mold, and applying heat thereto to shape the hollow material. When a fiber-reinforced resin hollow part is molded using such an internal-pressure molding method, it is difficult to mold a flange portion integrally with the hollow part during the molding process. Thus, conventional fiber-reinforced resin hollow parts usually have no flange portions. Alternatively, even if they have flange portions, such flange portions are usually added later as appropriate to the fiber-reinforced resin hollow parts after the molding step.

Patent Document 1 describes an example of molding a fiber-reinforced resin hollow part with a non-uniform cross-section using the aforementioned internal-pressure molding method. According to Patent Document 1, a prepreg is wound around a mandrel with a circular cross-section and the mandrel is subsequently pulled out to form a hollow part made of the prepreg. Then, a pressure bag is inserted into a hollow portion of the hollow part made of the prepreg, and the hollow part with the pressure bag inserted therein is disposed in a mold having a shape corresponding to the non-uniform profile of the hollow part and in which a replenishing prepreg is arranged in the non-uniform profile portion. Then, the hollow part is molded by an internal-pressure molding method to obtain a hollow part made of FRP with a homogeneous non-uniform cross-section.

Patent Document 2 discloses a structural member for use in building construction and a method of manufacturing such a structural member, wherein a braid is formed by winding reinforced fibers around the circumference of a hollow cylindrical liner (a shaping material), which is made of an elastic material such as thermoplastic resin, by a braiding method, and the braid is disposed within a shaping mold, and then the reinforced fibers are impregnated with resin and cured. When the fibers are impregnated with resin, pressurized air is concurrently supplied to the liner (shaping material) to prevent deformation of the liner.

Patent Document 1: JP Patent Publication (Kokai) No. 2006-123475 A

Patent Document 2: JP Patent Publication (Kokai) No. 2003-328498 A

DISCLOSURE OF THE INVENTION

Problems to be Solved by the Invention

In the method described in Patent Document 1, a prepreg is wound around a mandrel (hollow core) with a circular cross-section, and then the mandrel is pulled out to form a hollow part made of the prepreg. Thus, a long time is required to wind the prepreg around the mandrel to a required thickness. Further, since the hollow part made of the prepreg, which results after the mandrel is pulled out, has low strength, there is a possibility that local deformation, variation in thickness, or creases may be generated during the molding process in which pressure is applied via the pressure bag. Further, since a mandrel with a circular cross-section is used, the hollow part made of the prepreg is also substantially cylindrical in shape. Thus, in order to obtain a molded article with a non-uniform profile, it is necessary to dispose another prepreg in the shaping mold in a position corresponding to the non-uniform profile portion. For such reasons, it is impossible with the internal-pressure molding method to obtain a molded article with a non-uniform cross-section and substantially uniform thickness. Further, since the method is based on the premise that the mandrel should be pulled out, it is still impossible with this method to mold a flanged fiber-reinforced resin hollow part with a bent portion, for example. In order to obtain a molded article with a flange portion formed at one end thereof, an operation of braiding a prepreg at the end of the main body in accordance with the shape of the flange portion to be formed would be required, which could increase the workload.

In the method described in Patent Document 2, a braid which is a hollow part is formed by winding reinforced fibers around a hollow cylindrical liner (shaping material) by a braiding method. With this method, it is possible, though not described in Patent Document 2, to form a hollow braid with a non-circular cross-section or with a bent portion relatively easily. However, Patent Document 2 does not describe at all molding a fiber-reinforced resin hollow part with a flange portion formed at one end thereof.

Accordingly, a primary object of the present invention is to provide a fiber-reinforced resin hollow part with a flange portion integrally formed in a molding process using an internal-pressure molding method. It is a secondary object of the present invention to provide a molding method capable of easily molding such a flanged fiber-reinforced resin hollow part.

Means for Solving the Problems

A flanged fiber-reinforced resin hollow part in accordance with the present invention is characterized by having a flange portion that is integrally formed at one end of the fiber-reinforced resin hollow part in a molding process. Such a flanged fiber-reinforced resin hollow part has sufficient strength and has lighter weight than hollow parts with metal flanges. Further, since the flange portion is integrally formed with the hollow part, the strength of a portion joining the main body and the flange portion can be stable.

The present invention, as a method of molding the aforementioned fiber-reinforced resin hollow part with a flange portion integrally formed at one end thereof by an internal-pressure molding method, discloses a method of molding a flanged fiber-reinforced resin hollow part which includes a step of connecting a second core to one end of a preformed hollow resin core, a step of forming a hollow laminate by laminating reinforced fibers and matrix resin on the circumference of the hollow resin core and the second core, a step of pulling the second core out from the hollow laminate, a step of pressing a region of the hollow laminate, from which the second core has been pulled out, into a flange shape, a step of disposing the hollow laminate within a shaping mold, and a step of applying heat while concurrently applying internal pressure to the hollow laminate disposed within the shaping mold, thereby combining the resin with the reinforced fibers.

Further, the present invention, as an alternative method of molding the aforementioned fiber-reinforced resin hollow part with a flange portion integrally formed at one end thereof by an internal-pressure molding method, discloses a method of molding a flanged fiber-reinforced resin hollow part which includes a step of connecting a second core to one end of a preformed hollow resin core, a step of forming a hollow laminate by laminating reinforced fibers on the circumference of the hollow resin core and the second core, a step of pulling the second core out from the hollow laminate, a step of pressing a region of the hollow laminate, from which the second core has been pulled out, into a flange shape, a step of disposing the hollow laminate within a shaping mold, a step of injecting matrix resin into the shaping mold, and a step of applying heat while concurrently applying internal pressure to the hollow laminate disposed within the shaping mold, thereby combining the resin with the reinforced fibers.

According to the method of molding a flanged fiber-reinforced resin hollow part of the present invention, a hollow laminate is obtained by laminating reinforced fibers on a continuous body of a hollow resin core and a second core connected to one end thereof. Thus, lamination of the reinforced fibers is easy. The second core is pulled out from the thus formed hollow laminate, and a region of the reinforced fibers that is left after the second core was pulled out is pressed into a flat flange, for example. Thus, the flange portion can be continuous with the main body that is the hollow portion and can also be stable in strength. Then, the resulting hollow laminate is disposed within a shaping mold and the hollow laminate is heated with internal pressure applied thereto, whereby the resin and the reinforced fibers are combined. Thus, a flanged fiber-reinforced resin hollow part with lightweight and high strength can be provided in which the hollow portion, which is the main body, and the flange portion are integrally formed by means of continuous fiber-reinforced resin.

The method of molding a flanged fiber-reinforced resin hollow part of the present invention preferably includes a step of inserting a pressurization bag into the hollow resin core in the hollow laminate prior to the step of disposing the hollow laminate within the shaping mold. The application of the internal pressure to the hollow laminate disposed within the shaping mold is accomplished by applying pressure to the pressurization bag.

According to such an aspect, a member around which reinforced fibers are wound and a member upon which the internal pressure applied during the internal-pressure molding directly acts are separated as the hollow resin core and the pressurization bag, whereby the hollow resin core can serve only the function of a mandrel. Thus, reductions in thickness and weight are possible. Thereafter, the pressurization bag used for applying internal pressure is removed from the molded hollow part. Thus, a flanged fiber-reinforced resin hollow part with a sufficiently reduced weight can be provided.

The hollow resin core is a core that has been preformed in accordance with the shape of a fiber-reinforced resin hollow part to be obtained. The hollow resin core is left as it is in the hollow laminate. Thus, it is possible to easily and inexpensively mold a flanged fiber-reinforced resin hollow part with a substantially uniform thickness and a three-dimensionally non-uniform cross-section.

In the method of molding a flanged fiber-reinforced resin hollow part in accordance with the present invention, the method of laminating reinforced fibers on the circumference of the hollow resin core and the second core is not particularly limited. However, the reinforced fibers are preferably laminated by interweaving yarns by a braiding method because such a method can easily produce a hollow part with an arbitrary shape. Further, the interweaving of the yarns by the braiding method is preferably accomplished by alternately laminating a braiding layer having a braiding angle of 0 degree with respect to the axis and a braiding layer having a braiding angle of $\theta$ degrees with respect to the axis because such a method can provide high strength against bending with thin layers.

In the present invention, in the step of forming the hollow laminate by laminating the reinforced fibers and the matrix resin on the circumference of the preformed hollow resin core and the second core, the lamination of the reinforced fibers and the matrix resin can be carried out not only by sequentially laminating reinforced fiber layers and matrix resin layers but also by laminating a braid, which has been obtained by interweaving reinforced fibers and fibrous matrix resin, on the circumference of the hollow resin core.

The method of molding a flanged fiber-reinforced resin hollow part in accordance with the present invention preferably includes a step of putting stitches in a boundary region between a hollow portion of the hollow laminate and the flange-shaped portion prior to the step of disposing the hollow laminate within the shaping mold. According to such an aspect, it is possible to surely prevent the portion that has been pressed into a flange shape from being undesirably opened by the internal pressure applied during the internal-pressure molding.

According to the present invention, it is possible to provide a flanged fiber-reinforced resin hollow part that has lightweight and is extremely stable. In addition, according to the molding method of the present invention, it is possible to easily and inexpensively mold a flanged fiber-reinforced resin hollow part with a non-uniform cross-section and a bent portion with a sufficiently reduced weight and substantially uniform thickness.

BRIEF DESCRIPTION OF THE DRAWINGS

FIG. 1 illustrate examples of a preformed hollow resin core and a second core used in the method of the present invention, wherein FIG. 1A illustrates an exploded state and FIG. 1B illustrates an integrally connected state.

DESCRIPTION OF SYMBOLS 10 hollow resin core
11 open end
12 closed end
13 bent portion
14 internal space
15 second core
20, 20A hollow laminate
21 reinforced fiber layer (braiding layer)
22 braiding layer having a braiding angle of 0 degree with respect to the axis
23 braiding layer having a braiding angle of θ degrees with respect to the axis
24 matrix resin film
26 flange-shaped portion
27 stitches
30 pressurization bag
40, 40A shaping mold
41 pressurized-air supply valve
42 exhaust port
43 resin injection port
44 resin tank
45 matrix resin
50 flanged fiber-reinforced resin hollow part

BEST MODES FOR CARRYING OUT THE INVENTION

Hereinafter, the present invention will be described in further detail by way of embodiments with reference to the accompanying drawings.

Figure 1:
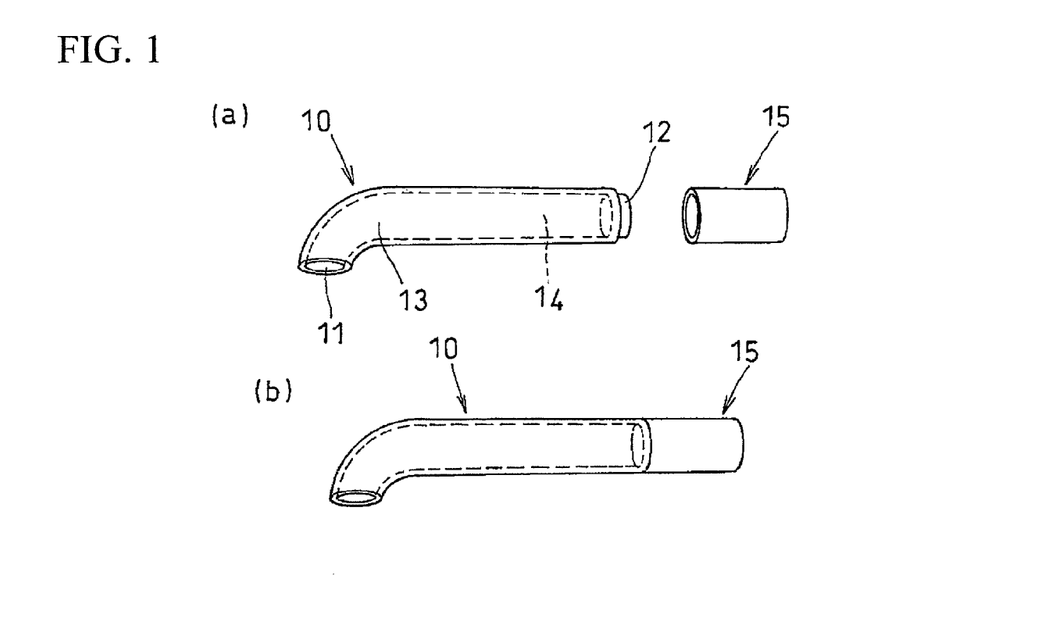

A hollow resin core 10 illustrated in FIG. 1 has one end 11 that is open, the other end 12 that is closed, and a bent portion 13 between the ends 11 and 12. The inside of the hollow resin core 10 is a space 14. The hollow resin core 10 is made of thermoplastic resin such as ABS resin, PS resin, or PC resin, and is preferably made of a resin material that softens but does not melt at a temperature for molding a fiber-reinforced resin hollow part which is described later. The thickness of the hollow resin core 10 may be about 1 mm. The hollow resin core 10 can also be formed by providing two split parts by vacuum molding or the like, and bonding them into a shape like the one illustrated in FIG. 1. Alternatively, the hollow resin core 10 can also be formed integrally by blow molding. The hollow resin core 10 is desirably dimensioned such that it is offset inward from the external shape of a flanged fiber-reinforced resin hollow part 50 to be molded by a given thickness. The "given thickness" herein means the thickness of the fiber-reinforced resin on the hollow portion of the flanged fiber-reinforced resin hollow part 50.

Reference numeral 15 denotes a second core which is a hollow cylindrical body made of an aluminum material. The second core 15 has a shape such that one end thereof can be attached to the closed end 12 of the hollow resin core 10 by appropriate means. The length of the second core 15 is determined in accordance with the length of a flange portion to be formed. It should be noted that the material of the second core 15 is not limited to aluminum materials as long as it is a material capable of withstanding the pressure of reinforced fibers to be laminated on the second core 15. Thus, the second core 15 can be formed with any materials such as resin materials.

As illustrated in FIG. 1B, the second core 15 is temporarily joined to the closed end 12 of the hollow resin core 10. A reinforced fiber layer 21 is formed by laminating reinforced fibers on the circumference of the cores, whereby a hollow laminate 20 is obtained that has a shape approximately equal to the shape of the fiber-reinforced resin hollow part to be obtained. The "reinforced fibers" herein can be those used for the conventionally-known fiber-reinforced resin. For example, carbon fibers are advantageously used. When reinforced fibers are laminated at a temperature below or equal to the room temperature, the hollow resin core 10 and the second core 12 have sufficient rigidity as a core (mandrel), and thus it is possible to easily laminate a reinforced fiber layer while managing the thickness thereof. The method of laminating reinforced fibers on the circumference of the hollow resin core 10 and the second core 15 can be any method. Preferably, the conventionally-known braiding method (cylindrical braiding) is used to laminate fibers while adjusting the braiding angle thereof. At this time, by interweaving the fibers while controlling the density of the weave such that the smaller-diameter portion of the hollow resin core 10 has a small braiding angle θ whereas the larger-diameter portion has a large braiding angle θ, it is possible to form a dense braiding layer (reinforced fiber layer) 21.

Figure 2:
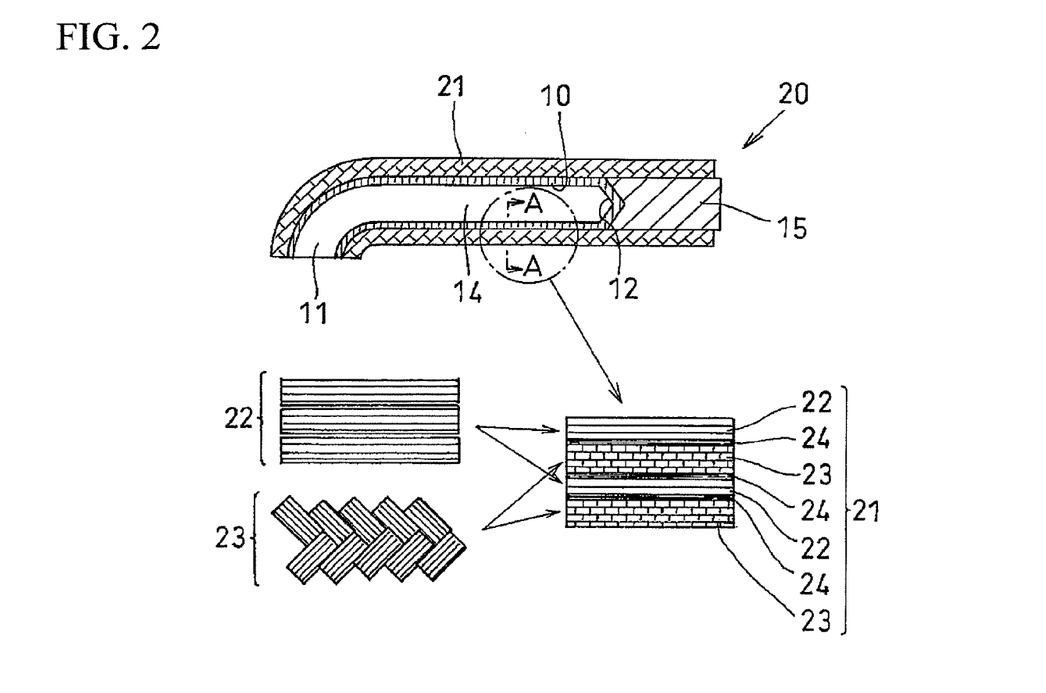
FIG. 2 illustrates an example of a hollow laminate.

More preferably, when reinforced fibers are laminated on the circumference of the hollow resin core 10 and the second core 15 as illustrated in FIG. 2, a braiding layer 22 having a braiding angle of 0 degree with respect to the axis and a braiding layer 23 having a braiding angle of θ degrees with respect to the axis as illustrated in the A-A cross-section of FIG. 2 are alternately laminated. Although FIG. 2 illustrates the reinforced fiber layer 21 with four layers, the numbers of layers is arbitrary, and an appropriate number of layers may be provided with the required strength taken into consideration. With the reinforced fiber layer 21 having such a configuration, it is possible to improve and control the tensile strength of the layer in the longitudinal direction. Accordingly, the hollow laminate 20 with the same strength can be formed with the thinner reinforced fiber layer 21, which contributes to a reduction in weight. Further, the time required for the operation can be reduced and the step of laminating the reinforced fiber layer can be suppressed to within 30 minutes, which would otherwise require four to five hours if a prepreg is laminated by hand.

In the example illustrated in FIG. 2, a matrix resin film 24 is further laminated between the braiding layer 22 and the braiding layer 23. The matrix resin can be thermosetting resin such as unsaturated polyester resin, epoxy resin, or polyimide resin, or thermoplastic resin such as polyethylene, polypropylene, or polyamide. It is appropriately selected in accordance with the application of the flanged fiber-reinforced resin hollow part 50 to be obtained or with the required value of properties. For example, in order to manufacture a pillar of an automobile using the flanged fiber-reinforced resin hollow part 50, thermosetting resin is desirably used.

Figure 3:
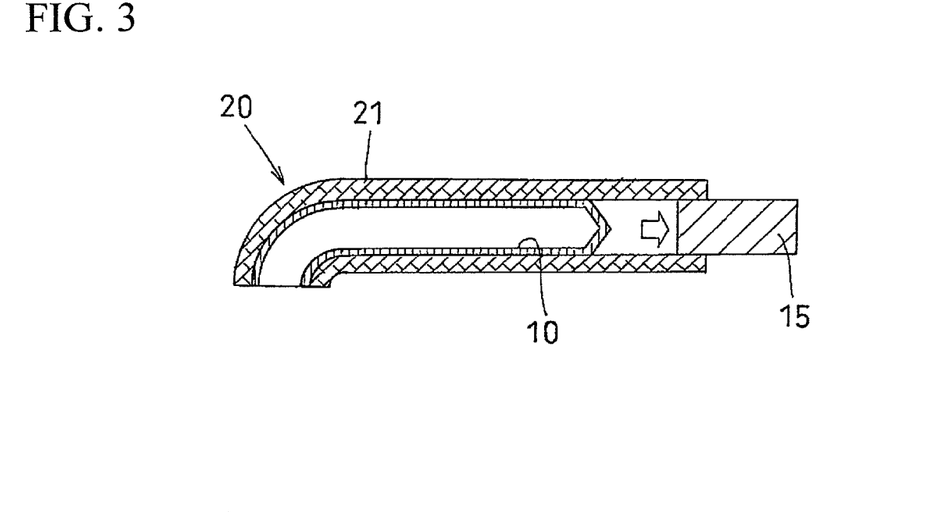
FIG. 3 illustrates a state in which the second core is pulled out from the hollow laminate illustrated in FIG. 2.
Figure 4:
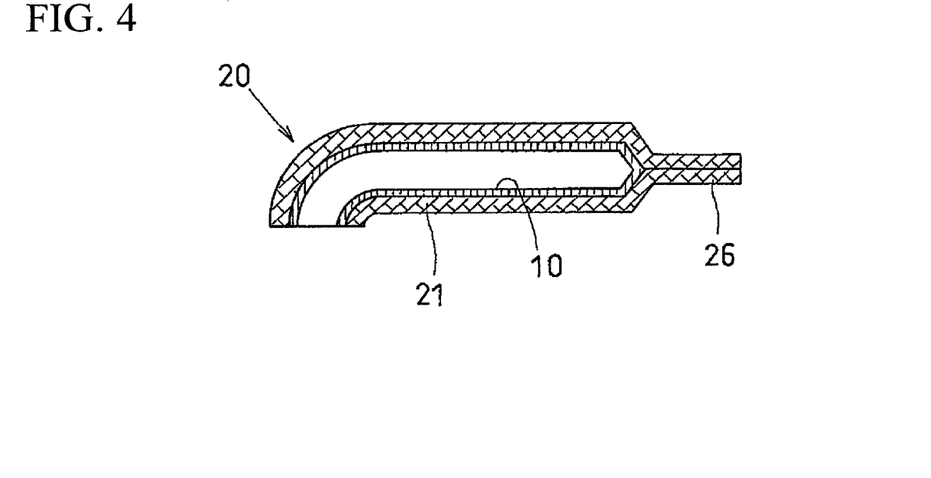
FIG. 4 illustrates a hollow laminate molded in the shape of a flange with pressure applied to a region that is left after the second core is pulled out.

As illustrated in FIG. 3, the temporarily joined second core 15 is pulled out from the formed hollow laminate 20. After that, a region of the hollow laminate 20, in which the second core 15 has been present, is pressed from the top and bottom by appropriate means, whereby a flange-shaped portion 26 is formed as illustrated in FIG. 4. The flange-shaped portion 26 is typically formed in the shape of a flat plate. However, it can also be pressed into a shape with a curvature, a shape with a bent portion, or the like in accordance with the usage of the flanged fiber-reinforced resin hollow part 50.

Figure 5:
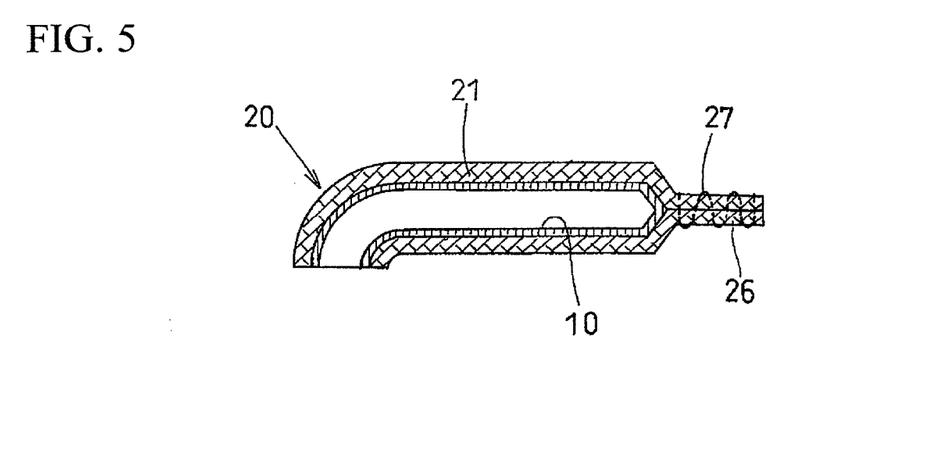
FIG. 5 illustrates another embodiment of the hollow laminate illustrated in FIG. 4.

Preferably, as illustrated in FIG. 5, stitches 27 are put at least in the boundary region between the flange-shaped portion 26 and the hollow portion using a sewing machine or the like. Such stitches can be provided in the entire region of the flange-shaped portion 26 as shown. A thread used for the stitches is preferably made of the same material (e.g., carbon fibers) as the yarns that form the reinforced fiber layer 21. However, a typical thread such as thermoplastic resin can also be used.

Next, a pressurization bag 30 is inserted into the internal space 14 of the hollow resin core 10 of the formed hollow laminate 20. The pressurization bag 30 serves the function of transmitting the pressure given within the pressurization bag 30 to the reinforced fiber layer 21 via the aforementioned hollow resin core 10 during the molding process. Thus, the pressurization bag 30 is made of an elastic, easily deformable material, for example, synthetic rubber or a resin sheet such as a nylon sheet or an urethane sheet. The shape of the pressurization bag 30 desirably coincides with the shape of the inner surface of the hollow resin core 10. However, it can be a shape approximately equal to the shape of the inner surface of the hollow resin core 10 as long as the pressurization bag 30 can be deformed with the internal pressure applied thereto and can thus be closely attached to the inner surface of the hollow resin core 10.

Figure 6:
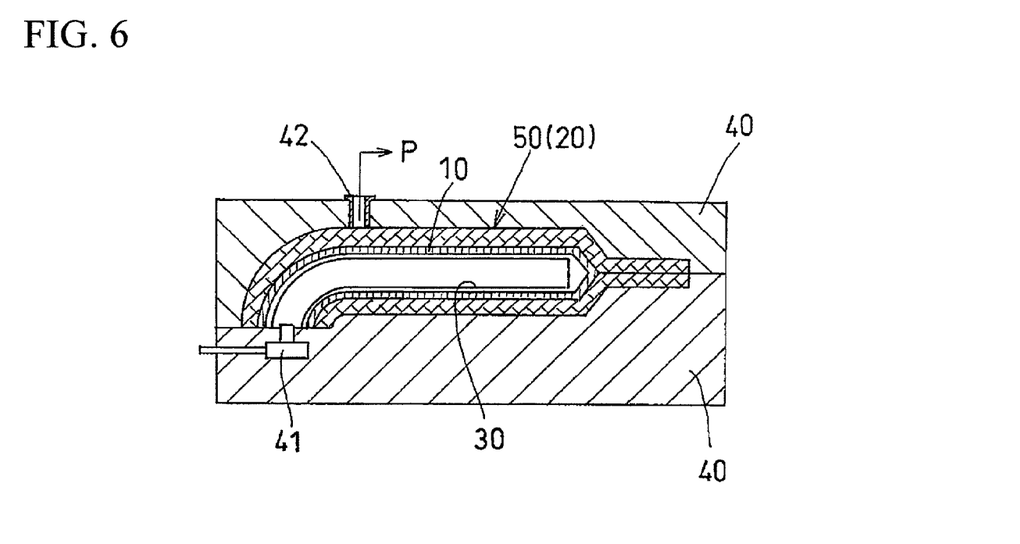
FIG. 6 illustrates an example in which a hollow laminate is disposed within a shaping mold to mold a flanged fiber-reinforced resin hollow part.

Then, as illustrated in FIG. 6, the hollow laminate 20 with the pressurization bag 30 inserted into the internal space 14 of the hollow resin core 10 is disposed within a cavity of a shaping mold 40 that is provided with a heater (not shown). The shaping mold 40 has a pressurized-air supply valve 41 at a position where the open end 11 of the hollow resin core 10 is located and also has an exhaust port 42 for connecting the cavity space to a vacuum pump P. The shaping mold 40 also has a cavity region corresponding to the flange-shaped portion 26 formed with the aforementioned hollow laminate 20.

After the shaping mold 40 is closed, the vacuum pump P is activated to produce a vacuum in the cavity. Accordingly, air in the reinforced fiber layer 21 of the hollow laminate 20 is removed. In such a state, the heater is activated to increase the temperature up to the melting temperature of the matrix resin film 24 disposed between the reinforced fiber layers. Accordingly, the fibers become impregnated with the molten resin. Before or after the resin starts to melt and impregnation starts, the pressurized-air supply valve 41 is opened to supply pressurized air into the pressurization bag 30. The pressure can be about 0.1 MPa to 1 MPa or higher than that. With the pressurized air supplied, internal pressure is applied to the pressurization bag 30, which in turn causes the reinforced fiber layer 21 to be inflated to the outer side with the softened hollow resin core 10 interposed therebetween. Accordingly, the reinforced fiber layer 21 is pressed against the cavity inner surface, and thus is shaped. Such shaping is effected by the pressure that acts from the pressurization bag 30 made of an elastic, easily deformable material as described above. Thus, substantially equal pressure acts upon the entire region corresponding to the hollow portion of the reinforced fiber layer 21, whereby the resulting thickness can be uniform even in a region with a non-uniform cross-section.

The pressure from the pressurization bag 30 does not act upon the flange-shaped portion 26 in the cavity. Thus, the flange-shaped portion 26 is shaped only by the clamping of the mold. However, since the internal pressure acts upon the boundary region between the flange-shaped portion 26 and the hollow portion, the region could be deformed in a direction that opens the flange-shaped portion 26. In order to prevent such deformation, the aforementioned stitches 27 are provided.

When the matrix resin is thermosetting resin, the temperature is further increased up to the curing temperature, and the temperature is retained. Accordingly, the resin cures in such a manner that it forms a matrix together with the reinforced fibers, thereby producing fiber-reinforced resin. After the resin is cured, the internal pressure of the pressurization bag 30 is removed, followed by cooling and opening of the shaping mold. Then, removing the flanged fiber-reinforced resin hollow part with the cured resin from the shaping mold and further removing the pressurization bag 30 will provide the flanged fiber-reinforced resin hollow part 50 with a sufficiently reduced weight in accordance with the present invention.

Figure 7:
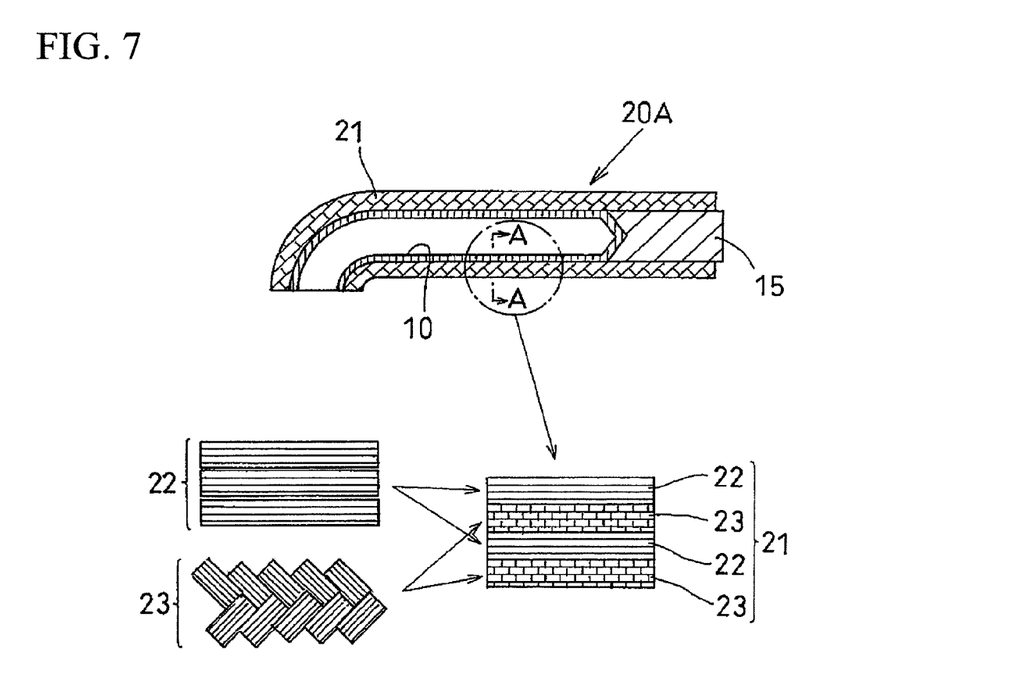
FIG. 7 illustrates another example of a hollow laminate.

FIG. 7 illustrates a hollow laminate 20A used in another embodiment of a method of molding the flanged fiber-reinforced resin hollow part 50 in accordance with the present invention. This hollow laminate 20A differs from the hollow laminate 20 illustrated in FIG. 2 only in that the matrix resin film 24 is not provided between the fiber layers 22 and 23. The other structures can be the same. Thus, the same portions are denoted by the same reference numerals and description thereof is omitted.

Figure 8:
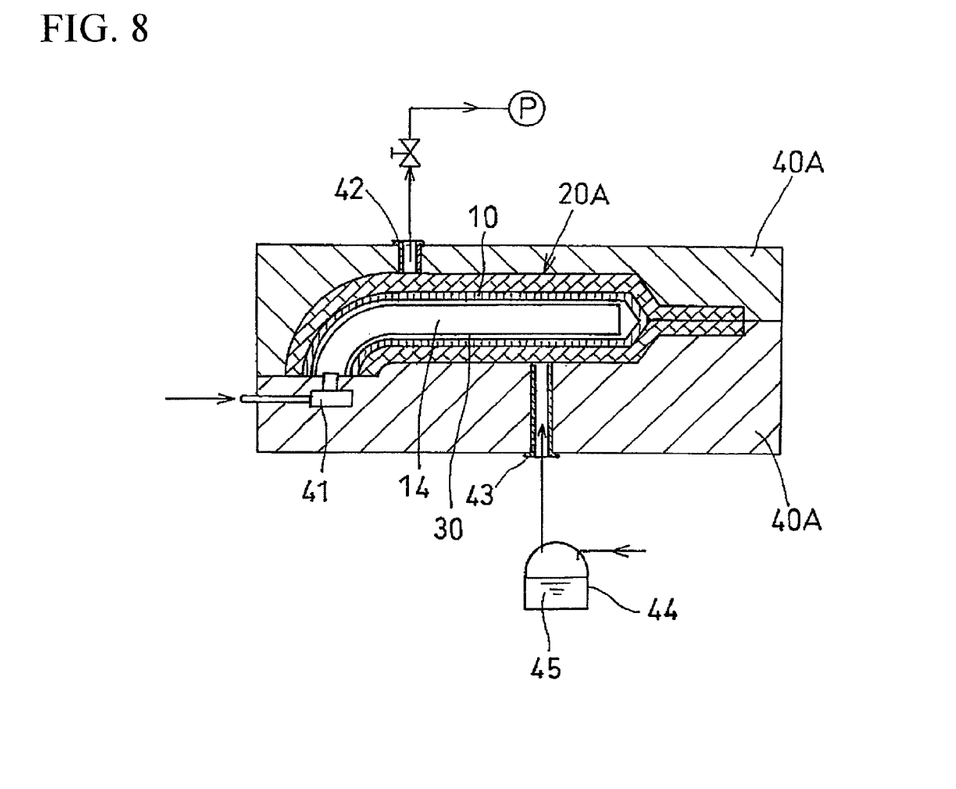
FIG. 8 illustrates another example in which the hollow laminate illustrated in FIG. 7 is disposed within a shaping mold to mold a flanged fiber-reinforced resin hollow part.

FIG. 8 illustrates a case in which the hollow laminate 20A is disposed within a shaping mold 40A to mold the flanged fiber-reinforced resin hollow part 50. Here, the shaping mold 40A has a resin injection port 43 so that matrix resin 45 can be supplied from a resin tank 44 to the cavity through the port 43. The other structures are the same as those of the shaping mold 40 illustrated in FIG. 6. Thus, the same portions are denoted by the same reference numerals and description thereof is omitted.

In the molding process, the hollow laminate 20A with the pressurization bag 30 inserted into the internal space 14 of the hollow resin core 10 is disposed within the cavity of the shaping mold 40A. After the shaping mold 40 is closed, the vacuum pump P is activated to create a vacuum in the cavity. In such a state, the heater is activated to increase the temperature up to the melting temperature of the matrix resin 45, and the matrix resin 45 is supplied to the cavity through the resin injection port 43. Accordingly, fibers are impregnated with the supplied matrix resin 45. When a sufficient amount of resin has been supplied, the resin injection port 43 is closed.

Before or after the resin starts to be supplied, the pressurized-air supply valve 41 is opened to supply pressurized air into the pressurization bag 30. This and subsequent procedures are the same as the molding procedures described with reference to FIG. 6. Thus, description thereof is omitted. Such a molding method can also provide the flanged fiber-reinforced resin hollow part 50 with a substantially uniform thickness across the entire region and sufficiently reduced weight.

Figure 9:
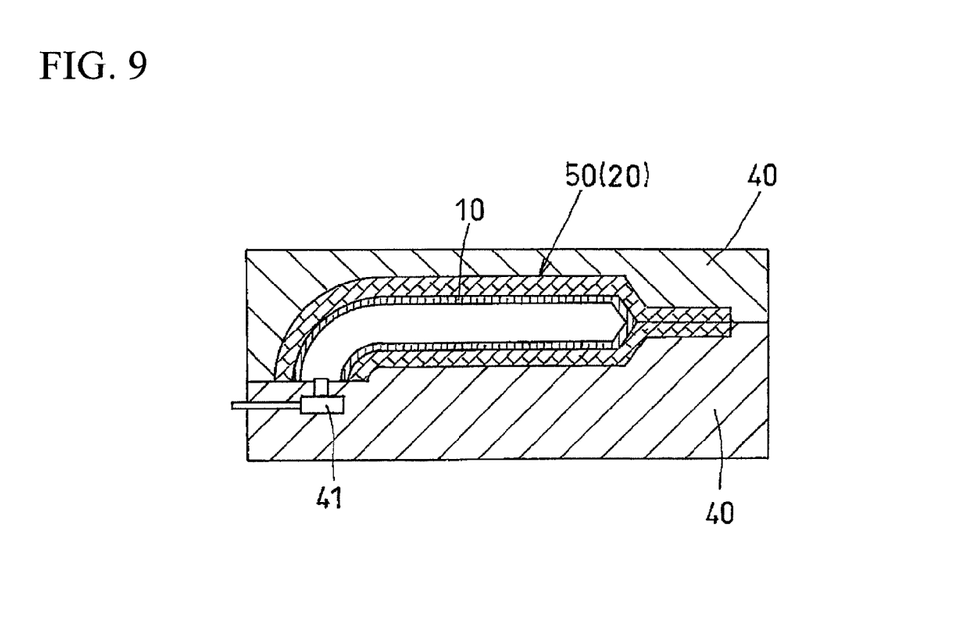
FIG. 9 illustrates still another example in which a hollow laminate is molded as a flanged fiber-reinforced resin hollow part.

FIG. 9 illustrates still another example of molding the hollow laminate 20 as the flanged fiber-reinforced resin hollow part 50. The hollow laminate 20 used here is the same as that described with reference to FIG. 4 or FIG. 5, and the shaping mold 40 is also the same as that described with reference to FIG. 6. FIG. 9 only differs from the previously illustrated figures in that in the molding process, the pressure of the pressurized air that enters from the pressurized-air supply valve 41 is made to act directly upon the inner surface of the hollow resin core 10 without the use of the aforementioned pressurization bag 30. Such a molding method is possible when the hollow resin core 10 has sufficient airtightness. Such a molding method can also be applied to the molding method described with reference to FIG. 8 in which the hollow laminate 20 and the shaping mold 40A are used.

As described above, the flanged fiber-reinforced resin hollow part 50 obtained with the molding method in accordance with the present invention has an integrated structure of fiber-reinforced resin with which the hollow main body and the flange portion are continuous. Thus, the flanged fiber-reinforced resin hollow part 50 can have a light weight and high mechanical strength even at the boundary portion between the flange portion and the hollow main body.

It should be noted that the molding method in accordance with the present invention can be particularly advantageously used for forming the flanged fiber-reinforced resin hollow part 50 with a three-dimensionally non-uniform cross-section and a bent portion. However, it can also be used for forming the flanged fiber-reinforced resin hollow part 50 with a simple cross-section such as a circular cross-section or the flanged fiber-reinforced resin hollow part 50 with a linear flange.

Further, although the second core 15 described above is cylindrical in shape, it may be in the shape of an open curved plate under the condition that the length thereof coincides with the circumferential length of a region that becomes a flange.

The invention claimed is:

1. A method of molding a flanged fiber-reinforced resin hollow part, the method being adapted to mold a fiber-reinforced resin hollow part with a flange portion integrally formed at one end thereof by an internal-pressure molding method, comprising:

a step of connecting a second core to one end of a preformed hollow resin core, wherein the preformed hollow resin core is closed at the one end and open at an opposite end;

a step of forming a hollow laminate by laminating at least reinforced fibers on a circumference of the hollow resin core and the second core;

a step of pulling the second core out from the hollow laminate, and pressing inwardly together a region of the hollow laminate, from which the second core has been pulled out, into a flattened shape to form a flange portion, so as to form a hollow laminate with the flange portion formed at one end thereof;

a step of disposing the hollow laminate within a shaping mold; and a step of shaping the hollow laminate with the flange portion disposed within the shaping mold into a flanged fiber-reinforced resin hollow part by an internal-pressure molding method.

2. The method of molding a flanged fiber-reinforced resin hollow part according to claim 1, further comprising a step of inserting a pressurization bag into the open end of the hollow resin core in the hollow laminate prior to the step of disposing the hollow laminate within the shaping mold, wherein the application of the internal pressure to the hollow laminate disposed within the shaping mold is accomplished by applying pressure to the pressurization bag.

3. The method of molding a flanged fiber-reinforced resin hollow part according to claim 1, further comprising a step of putting stitches in a boundary region between a hollow portion of the hollow laminate and the flange-shaped portion prior to the step of disposing the hollow laminate within the shaping mold.

4. The method of molding a flanged fiber-reinforced resin hollow part according to claim 1, wherein the step of laminating reinforced fibers on the circumference of the hollow resin core and the second core is accomplished by interweaving yarns by a braiding method.

5. The method of molding a flanged fiber-reinforced resin hollow part according to claim 4, wherein the interweaving of the yarns by the braiding method is accomplished by alternately weaving a braiding layer having a braiding angle of 0degree with respect to an axis and a braiding layer having a braiding angle of $\theta$ degrees with respect to the axis.

* * * * *